US012007078B2

(12) United States Patent
Li et al.

(10) Patent No.: US 12,007,078 B2
(45) Date of Patent: Jun. 11, 2024

(54) SHADOWLESS WATERPROOF LED LAMP BULB

(71) Applicant: Sichuan Jamie Charming Technology Co., Ltd., Nanchong (CN)

(72) Inventors: Min Li, Nanchong (CN); Xin Zhang, Nanchong (CN); Yanhong Gui, Nanchong (CN)

(73) Assignee: SICHUAN JAMIE CHARMING TECHNOLOGY CO., LTD., Nanchong (CN)

( * ) Notice: Subject to any disclaimer, the term of this patent is extended or adjusted under 35 U.S.C. 154(b) by 0 days.

(21) Appl. No.: 18/404,771

(22) Filed: Jan. 4, 2024

(65) Prior Publication Data

US 2024/0142066 A1 May 2, 2024

(30) Foreign Application Priority Data

Dec. 18, 2023 (CN) ........................ 202323440391.2

(51) Int. Cl.

| | |
|---|---|
| ***F21K 9/232*** | (2016.01) |
| ***F21K 9/235*** | (2016.01) |
| ***F21V 19/00*** | (2006.01) |
| ***F21V 31/00*** | (2006.01) |
| *F21Y 115/10* | (2016.01) |

(52) U.S. Cl.

CPC .............. *F21K 9/232* (2016.08); *F21K 9/235* (2016.08); *F21V 19/0005* (2013.01); *F21V 31/005* (2013.01); *F21Y 2115/10* (2016.08)

(58) Field of Classification Search

CPC ...... F21K 9/232; F21K 9/235; F21V 19/0005; F21V 31/005; F21Y 2115/10

See application file for complete search history.

(56) References Cited

U.S. PATENT DOCUMENTS

| | | | | |
|---|---|---|---|---|
| 10,323,799 | B2 * | 6/2019 | Huang | F21K 9/238 |
| 11,635,173 | B1 * | 4/2023 | Wang | F21V 19/0015 313/271 |
| 2008/0080187 | A1 * | 4/2008 | Purinton | F21V 3/02 362/294 |
| 2018/0347765 | A1 | 12/2018 | Jiang | |
| 2020/0176646 | A1 * | 6/2020 | Li | C09K 11/886 |
| 2021/0325007 | A1 | 10/2021 | Jiang | |
| 2022/0042657 | A1 | 2/2022 | Jiang | |
| 2023/0047982 | A1 * | 2/2023 | Wu | F21S 4/10 |

(Continued)

*Primary Examiner* — Evan P Dzierzynski

(74) *Attorney, Agent, or Firm* — Zhigang Ma

(57) ABSTRACT

The present disclosure relates to the technical field of lamp bulb, and discloses a shadowless waterproof light-emitting diode (LED) lamp bulb, including a lamp holder and a lampshade connected to the lamp holder, and further including a lampwick component and a sealing plug; the lampwick component includes a base plate, a first metal support line, and a second metal support line; and the other end of the first metal support line and the other end of the second metal support line are both electrically connected to the lamp holder. The present disclosure has the following advantages: 1. The structure of a luminous element is improved, which effectively solves the technical problem of light shadow generated by the lamp bulb during use; 2. The lamp bulb has a novel structure and higher decorability; and 3. The overall lamp bulb is convenient to assemble and higher in production and assembling efficiency.

10 Claims, 6 Drawing Sheets

(56) References Cited

U.S. PATENT DOCUMENTS

| | | | | |
|---|---|---|---|---|
| 2023/0090229 | A1* | 3/2023 | Lei | F21K 9/232<br>362/249.02 |
| 2023/0151934 | A1* | 5/2023 | Lei | F21K 9/238<br>362/217.14 |

* cited by examiner

SHADOWLESS WATERPROOF LED LAMP BULB

TECHNICAL FIELD

The present disclosure relates to the technical field of lamp bulbs, and in particular, to a shadowless waterproof light-emitting diode (LED) lamp bulb.

BACKGROUND

A lamp bulb refers to a lighting source that emits light through electrical energy. The most common function of the lamp bulb is lighting. With the development of society, the lamp bulbs are also applied to different scenarios. Functional lamps with different purposes such as "beautifying and decorating the environment" have emerged. Especially in holidays, various decorative light strings can be combined with surrounding roads, landscapes, and buildings for lighting design and installation, thereby achieving the unity of function and artistry and creating a unique festive atmosphere.

Chinese patent CN202123174763.2 discloses a plug-in lamp bulb, including a lamp holder, a lampshade, and a lamp base. A bottom of the lampshade is provided with a connecting part, and the lamp holder is sleeved inside the connecting part. In the prior art, conductive parts are arranged at two ends of a luminous element, and the conductive parts are electrically connected to positive and negative metal support lines to form a loop to turn on the luminous element. However, since one of the metal support lines needs to be connected to the conductive part at an upper end through a top end of the luminous element, there will always be a metal support bar on one side of the luminous element. When the luminous element is turned on, light will be blocked by the metal support bar, causing a strip-shaped shadow in a lighting effect. This phenomenon is more obvious when the lamp bulb is provided with an opaque or semi-transparent lampshade, and the shadow will greatly affect the decorative effect of the lamp bulb and reduce the decorability of the lamp bulb. In view of this, the inventor has made a new invention.

SUMMARY

The present disclosure aims to provide a shadowless waterproof LED lamp bulb for the shortcomings in the prior art. The shadowless waterproof LED lamp bulb has the characteristic of high decorability.

In order to achieve the above objectives, the present disclosure provides a shadowless waterproof LED lamp bulb, including a lamp holder and a lampshade connected to the lamp holder, further including a lampwick component and a sealing plug; the lampwick component includes a base plate, a first metal support line, and a second metal support line; the base plate extends to be provided with a light source part; the light source part extends into the lampshade; the light source part is provided with an LED light-emitting chipset on at least one side; the light source part is provided with conductive wires at two ends of the LED light-emitting chipset; the conductive wires extend to the base plate and is electrically connected to the metal support lines; the other end of the first metal support line and the other end of the second metal support line are both electrically connected to the lamp holder; a rubber base is further arranged in middle parts of the first metal support line and the second metal support line; the sealing plug is assembled at an opening part of the lampshade; and the sealing plug is provided with an assembling hole position configured to assemble the rubber base.

Preferably, the sealing plug and the opening part of the lampshade form a filling recess, and the filling recess is provided with a sealant layer.

Preferably, the assembling hole position includes an upper hole position and a lower hole position which are arranged in sequence from top to bottom; the upper hole position is communicated to the lower hole position; and a diameter of the upper hole position is less than a diameter of the lower hole position; the rubber base includes an upper cylindrical part and a lower cylindrical part which are integrally arranged; the upper cylindrical part is matched with the upper hole position; and the lower cylindrical part is matched with the lower hole position.

Preferably, widths of upper ends of both the first metal support line and the second metal support line are greater than widths of lower ends.

Preferably, the rubber base is integrated on the metal support lines in an injection-molding manner.

Preferably, the lampwick component further includes a resistor; and the resistor is arranged on the first metal support line or the second metal support line.

Preferably, the rubber base is arranged outside the resistor.

Preferably, the lampwick component further includes a resistor; and the resistor is arranged at the light source part.

Preferably, a surface of the light source part is further provided with a fluorescent adhesive layer configured to package the LED light-emitting chipset and the conductive wires.

Preferably, a diameter of an upper end of the sealing plug is less than a diameter of a lower end.

Beneficial effects: Compared with the prior art, the shadowless waterproof LED lamp bulb of the present disclosure includes the lamp holder and the lampshade connected to the lamp holder, and further includes the lampwick component and the sealing plug. The present disclosure has the following advantages: 1. The structure of a luminous element is improved, which effectively solves the technical problem of light shadow generated by the lamp bulb during use; 2. The lamp bulb has a novel structure and higher decorability; and 3. The overall lamp bulb is convenient to assemble and higher in production and assembling efficiency.

Figure 1:
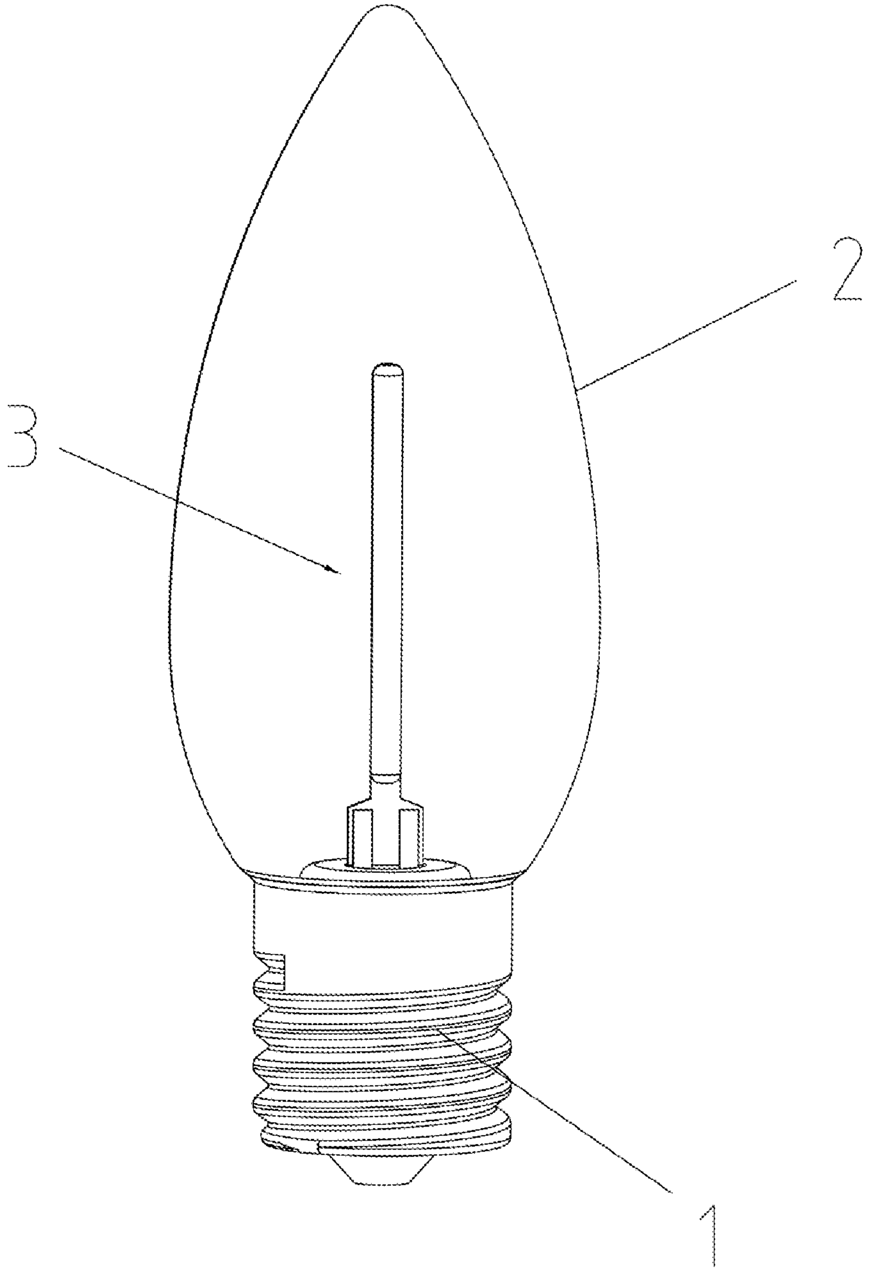
FIG. 1 is a schematic diagram of a three-dimensional structure of the present disclosure.

Reference numerals include:

1: lamp holder; 2: lampshade; 3: lampwick component; 31: base plate; 311: light source part; 312: LED light-emitting chipset; 313: conductive wire; 314: fluorescent adhesive layer; 32: first metal support line; 33: second metal support line; 34: rubber base; 341: upper cylindrical part; 342: lower cylindrical part; 4: sealing plug; 41: assembling hole position; 411: upper hole position; 412: lower hole position; 5: filling recess; 51: sealant layer; and 6: resistor.

DETAILED DESCRIPTION OF THE EMBODIMENTS

The present disclosure will be explained below in conjunction with the accompanying drawings 1 to 6.

The present disclosure discloses a shadowless waterproof LED lamp bulb, including a lamp holder 1 and a lampshade 2 connected to the lamp holder 1, further including a lampwick component 3 and a sealing plug 4; the lampwick component 3 includes a base plate 31, a first metal support line 32, and a second metal support line 33; the base plate 31 extends to be provided with a light source part 311; the light source part 311 extends into the lampshade 2; the light source part 311 is provided with an LED light-emitting chipset 312 on at least one side; the light source part 311 is provided with conductive wires 313 at two ends of the LED light-emitting chipset 312; the conductive wires 313 extend to the base plate 31 and is electrically connected to the metal support lines; the other end of the first metal support line 32 and the other end of the second metal support line 33 are both electrically connected to the lamp holder 1 to form a complete electrical loop to turn on the LED light-emitting chipset 312; a rubber base 34 is further arranged in middle parts of the first metal support line 32 and the second metal support line 33; the sealing plug 4 is assembled at an opening part of the lampshade 2; and the sealing plug 4 is provided with an assembling hole position 41 configured to assemble the rubber base 34.

Figure 2:
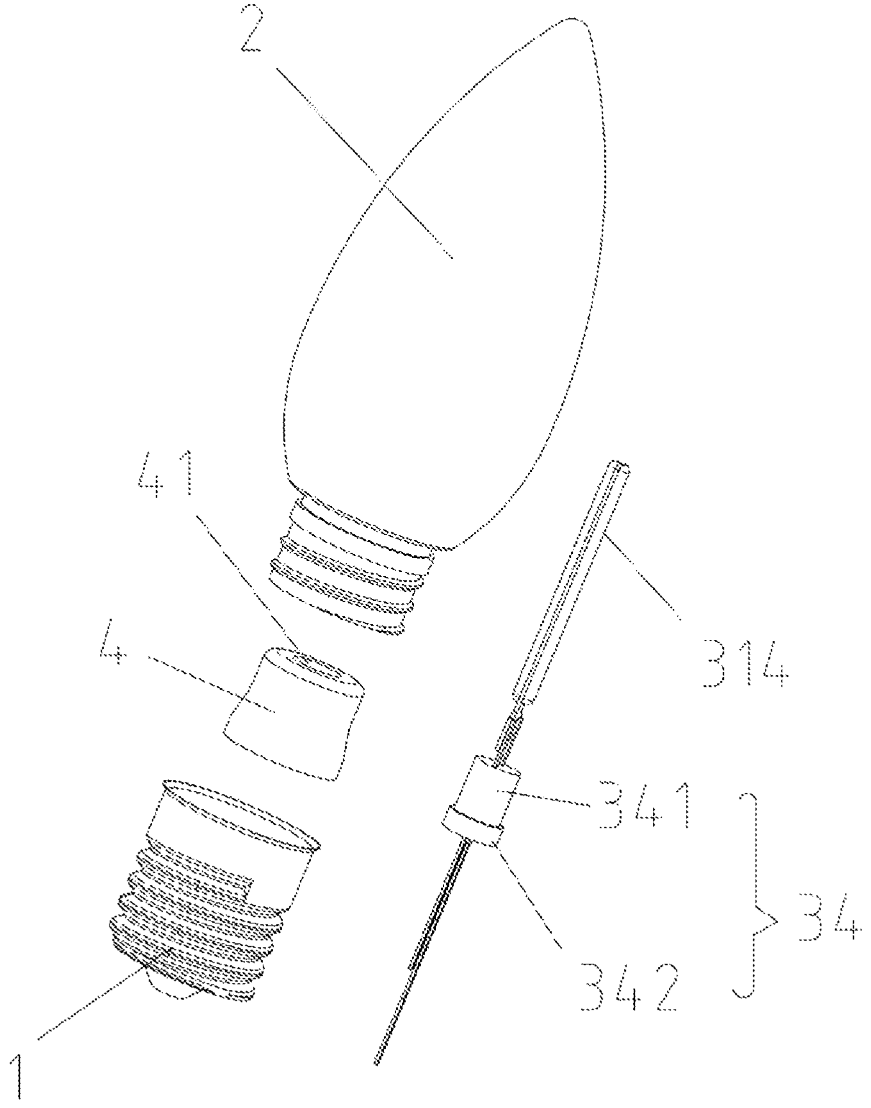
FIG. 2 is a schematic diagram of an exploded structure of the present disclosure.
Figure 3:
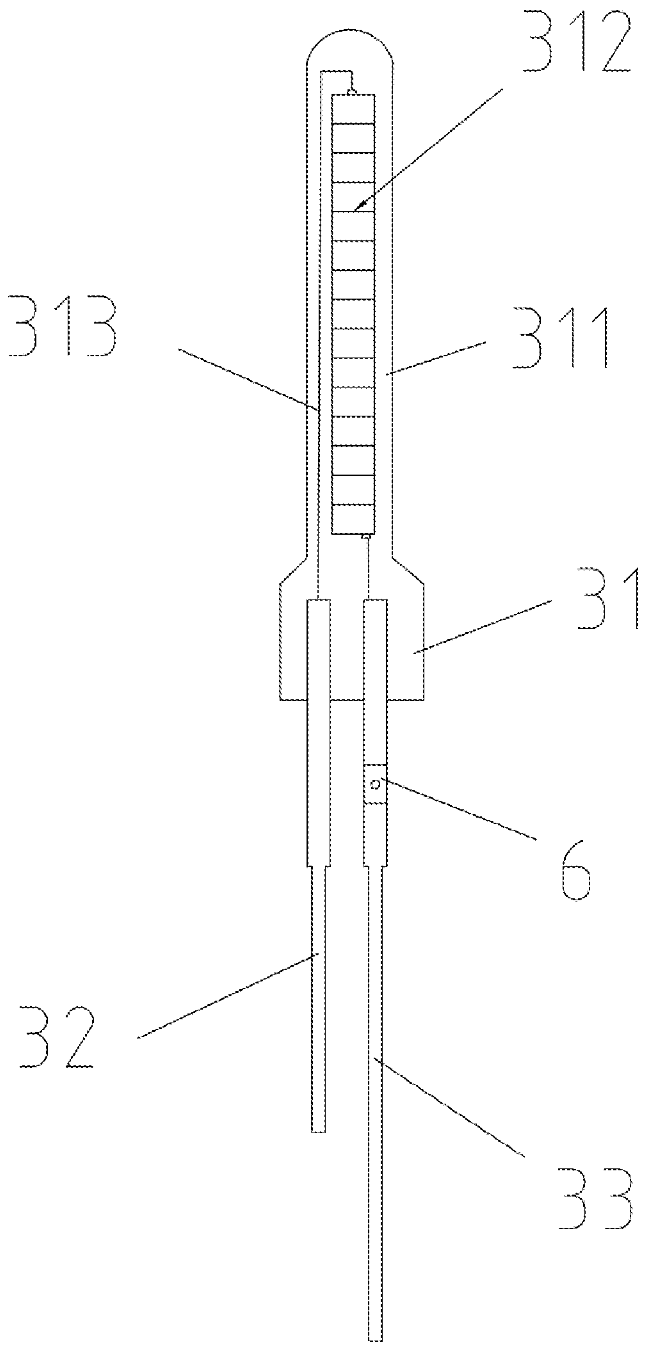
FIG. 3 is a schematic structural diagram of a lampwick component according to the present disclosure.
Figure 4:
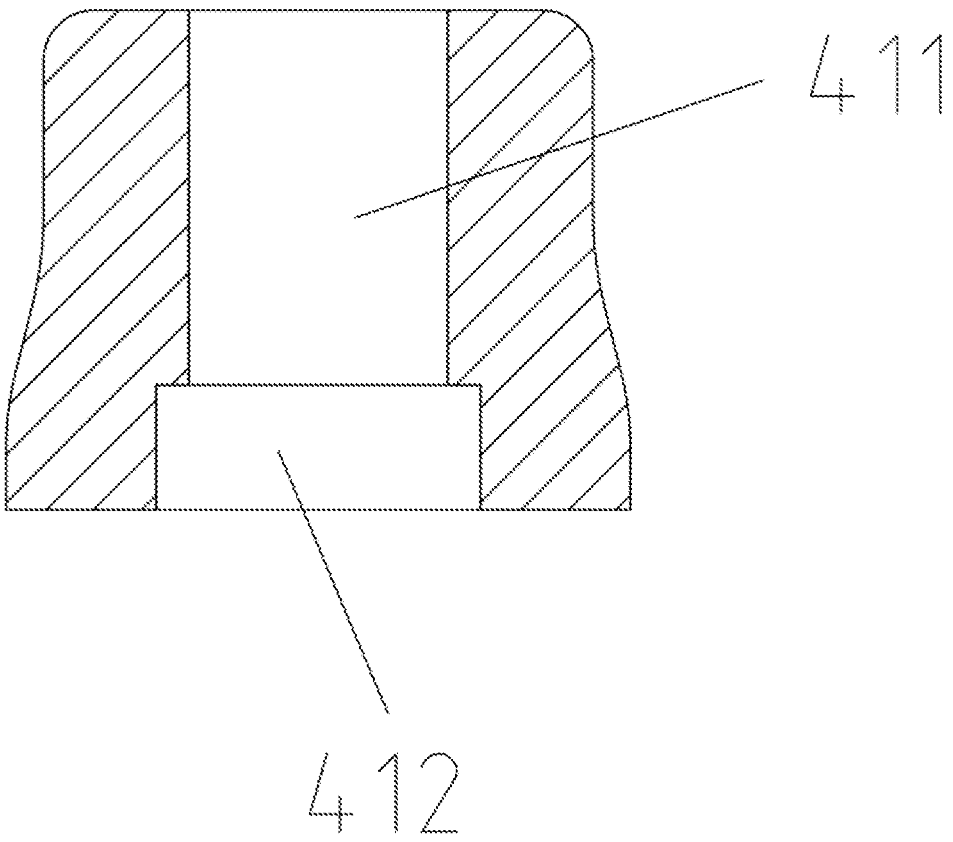
FIG. 4 is a schematic structural diagram of a sealing plug according to the present disclosure.
Figure 5:
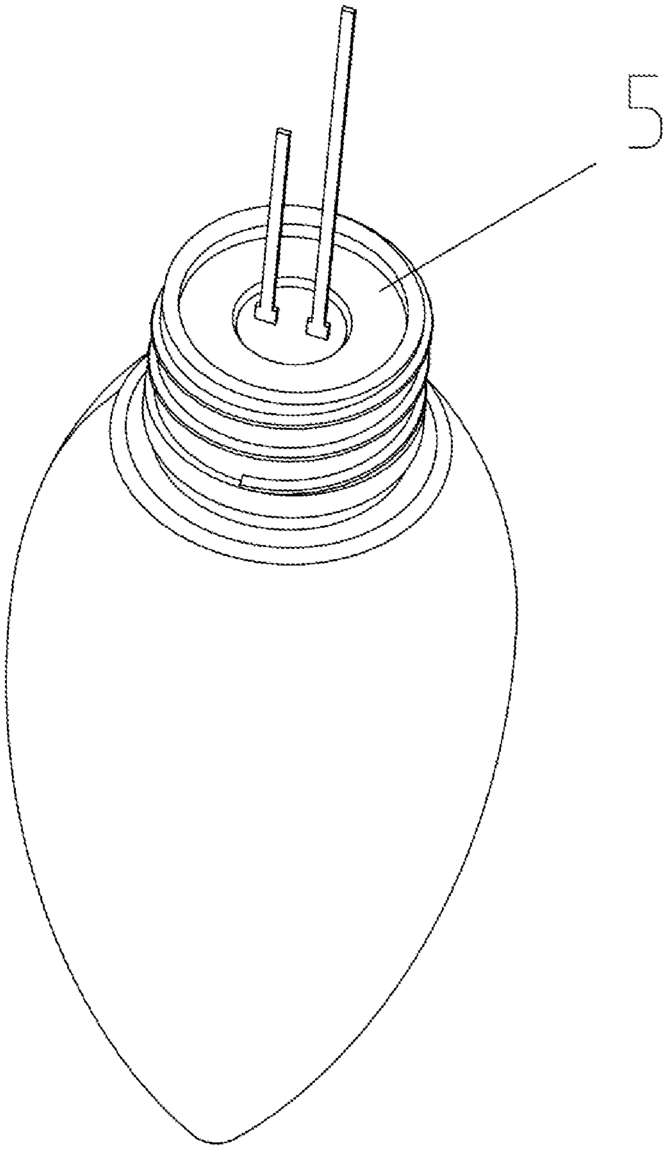
FIG. 5 is a schematic structural diagram of a filling recess according to the present disclosure.
Figure 6:
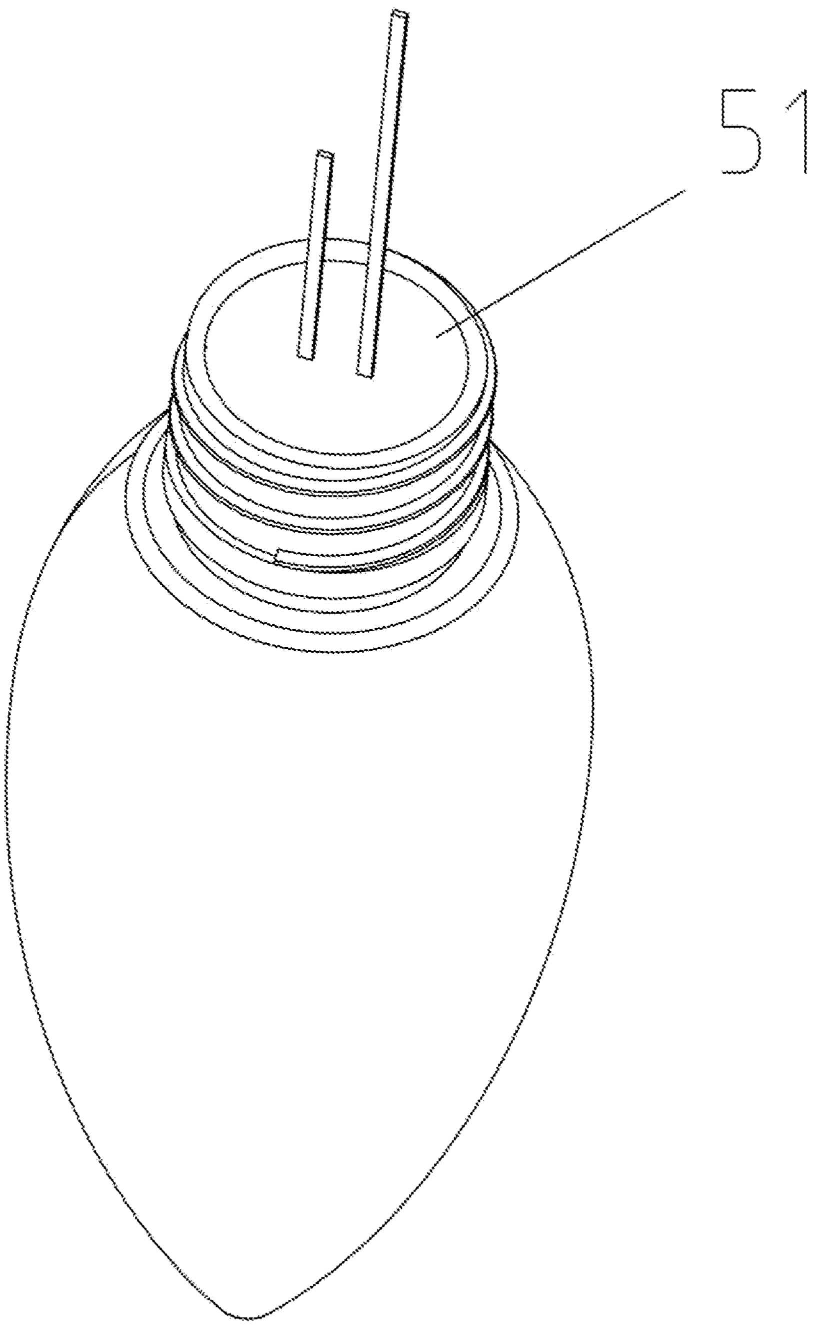
FIG. 6 is a schematic structural diagram of a sealant layer according to the present disclosure.

The present disclosure improves the structure of the lampwick component 3; an LED light-emitting chip and wires are all integrated into the light source part 311, which eliminates a metal conductive wire 313 on a side of the light source part 311 of the traditional lamp bulb, thereby solving the technical problem that the traditional lamp bulb easily causes a strip-shaped shadow that affect the decorative effect during use. Even if the lamp bulb uses the opaque or semi-transparent lampshade 2 with a certain degree of transparency, shadows can be completely eliminated, so that the lamp bulb has higher decorability, and the lamp bulb is more attractive in appearance. On the other hand, as shown in FIG. 2, this technical solution supports and fixes a position of the lampwick component 3 by directly performing close fit between the rubber base 34 formed in the middle parts of the metal support lines and the assembling hole position 41 of the sealing plug 4. The formed lampwick component 3 can be directly arranged inside the sealing plug 4, which has a higher assembling efficiency and is conducive to further improving the production efficiency of the lamp bulb.

Preferably, the sealing plug 4 and the opening part of the lampshade 2 form a filling recess 5, and the filling recess 5 is provided with a sealant layer 51. In this embodiment, the sealant layer 51 seals the opening part of the lampshade 2 to further improve the waterproof performance of the lamp bulb. Secondly, the sealant layer 51 can further fix the two metal support lines during solidification molding.

In a further technical solution, the assembling hole position 41 includes an upper hole position 411 and a lower hole position 412 which are arranged in sequence from top to bottom; the upper hole position 411 is communicated to the lower hole position 412; and a diameter of the upper hole position 411 is less than a diameter of the lower hole position 412; correspondingly, the rubber base 34 includes an upper cylindrical part 341 and a lower cylindrical part 342 which are integrally arranged; the upper cylindrical part 341 is matched with the upper hole position 411; and the lower cylindrical part 342 is matched with the lower hole position 412. During assembling of the lamp bulb, the formed lampwick component 3 is arranged into the assembling hole position 41 from a lower end of the sealing plug 4. When the lower cylindrical part 342 is exactly correspondingly arranged to the lower hole position 412, the position of the rubber base 34 is limited, indicating that the assembling of the rubber base 34 is completed.

In this technical solution, the assembling hole position 41 is divided into the upper hole position and the lower hole position which have unequal widths, so that the lower cylindrical part 342 of the rubber base 34 can be clamped to the upper hole position 411, which can assist in positioning the rubber base 34, indicating the completion of the assembling of the rubber base 34, and also limit the position of the lampwick component 3 to prevent the lampwick component 3 from falling into the lampshade 2.

Preferably, widths of upper ends of both the first metal support line 32 and the second metal support line 33 are greater than widths of lower ends. Since the rubber base 34 is formed at the upper ends of the metal support lines, the large widths of the upper ends achieve a larger area of connection between the metal support lines and the rubber base 34, and the connection strength therebetween is higher, so that the rubber base 34 can play a better supporting role. Secondly, the small widths of the lower ends make it more convenient to bend the metal support lines and electrically connect the metal support lines to the lamp holder 1, which can save raw materials of the metal support lines and reduce the production cost.

In an embodiment, the rubber base 34 of this technical solution is not formed by perforating threading holes to assemble the metal support lines, but is directly integrated outside the two metal support lines in the injection molding manner. The formed rubber base 34 has better connection strength with the metal support lines. Meanwhile, the forming method is more concise and achieves easy preparation.

In an embodiment, in order to improve the safety of use of the lamp bulb, the lampwick component 3 further includes a resistor 6, and the resistor 6 can avoid excessive current in a lampwick and has a certain heat dissipation effect. The resistor 6 can be a small-size and lightweight SMT resistor 6. There are various embodiments of an assembling position of the resistor 6. When the resistor 6 is arranged on the first metal support line 32 or the second metal support line 33, the resistor 6 can be placed above or below the rubber base 34, or directly inside the rubber base 34. In the latter method, the rubber base 34 can be used to package and position the resistor 6 and can hide the resistor 6, and the resistor 6 will not affect the appearance of the lamp bulb. The two metal support lines can be provided with the resistors 6. If there are more resistors 6, the lampwick component 3 has higher safety and longer service life.

As another embodiment, the resistor 6 can also be integrated in the light source part 311. The resistor 6 is packaged and fixed together using a fluorescent adhesive layer 314, which can also hide the resistor 6, without affecting the appearance of the lamp bulb.

In this technical solution, a surface of the light source part 311 is further provided with a fluorescent adhesive layer 314 configured to package the LED light-emitting chipset 312 and the conductive wires 313. The packaged light source part 311 has a longer service life, and the fluorescent adhesive layer 314 can be made of epoxy resin, polyurethane modified epoxy resin, or polyurethane resin with light transmittance performance.

Preferably, a diameter of an upper end of the sealing plug 4 is less than a diameter of a lower end, so that an outer circumference of the sealing plug 4 is arranged as a structure with a narrow upper part and wide lower part, to reserve a sufficient buffer space at the front end of the sealing plug 4. When the sealing plug 4 is arranged into the opening part of the lampshade 2, a failure of assembling caused by a collision of the front end with an opening wall of the lampshade 2 is avoided as much as possible, which is conducive to improving the assembling efficiency.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A shadowless waterproof LED lamp bulb, comprising a lamp holder (1) and a lampshade (2) connected to the lamp holder (1), further comprising a lampwick component (3) and a sealing plug (4); the lampwick component (3) comprises a base plate (31), a first metal support line (32), and a second metal support line (33); the base plate (31) extends to be provided with a light source part (311); the light source part (311) extends into the lampshade (2); the light source part (311) is provided with an LED light-emitting chipset (312) on at least one side; the light source part (311) is provided with conductive wires (313) at two ends of the LED light-emitting chipset (312); the conductive wires (313) extend to the base plate (31) and is electrically connected to the metal support lines; the other end of the first metal support line (32) and the other end of the second metal support line (33) are both electrically connected to the lamp holder (1); a rubber base (34) is further arranged in middle parts of the first metal support line (32) and the second metal support line (33); the sealing plug (4) is assembled at an opening part of the lampshade (2); and the sealing plug (4) is provided with an assembling hole position (41) configured to assemble the rubber base (34).

2. The shadowless waterproof LED lamp bulb according to claim 1, wherein the sealing plug (4) and the opening part of the lampshade (2) form a filling recess (5), and the filling recess (5) is provided with a sealant layer (51).

3. The shadowless waterproof LED lamp bulb according to claim 1, wherein the assembling hole position (41) comprises an upper hole position (411) and a lower hole position (412) which are arranged in sequence from top to bottom; the upper hole position (411) is communicated to the lower hole position (412); and a diameter of the upper hole position (411) is less than a diameter of the lower hole position (412);

the rubber base (34) comprises an upper cylindrical part (341) and a lower cylindrical part (342) which are integrally arranged; the upper cylindrical part (341) is matched with the upper hole position (411); and the lower cylindrical part (342) is matched with the lower hole position (412).

4. The shadowless waterproof LED lamp bulb according to claim 1, wherein widths of upper ends of both the first metal support line (32) and the second metal support line (33) are greater than widths of lower ends.

5. The shadowless waterproof LED lamp bulb according to claim 1, wherein the rubber base (34) is integrated on the metal support lines in an injection-molding manner.

6. The shadowless waterproof LED lamp bulb according to claim 1, wherein the lampwick component (3) further comprises a resistor (6); and the resistor (6) is arranged on the first metal support line (32) or the second metal support line (33).

7. The shadowless waterproof LED lamp bulb according to claim 6, wherein the rubber base (34) is arranged outside the resistor (6).

8. The shadowless waterproof LED lamp bulb according to claim 1, wherein the lampwick component (3) further comprises a resistor (6); and the resistor (6) is arranged at the light source part (311).

9. The shadowless waterproof LED lamp bulb according to claim 1, wherein a surface of the light source part (311) is further provided with a fluorescent adhesive layer (314) configured to package the LED light-emitting chipset (312) and the conductive wires (313).

10. The shadowless waterproof LED lamp bulb according to claim 1, wherein a diameter of an upper end of the sealing plug (4) is less than a diameter of a lower end.

* * * * *